UNITED STATES PATENT OFFICE.

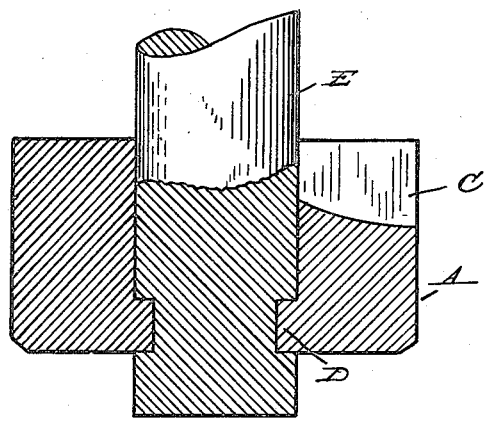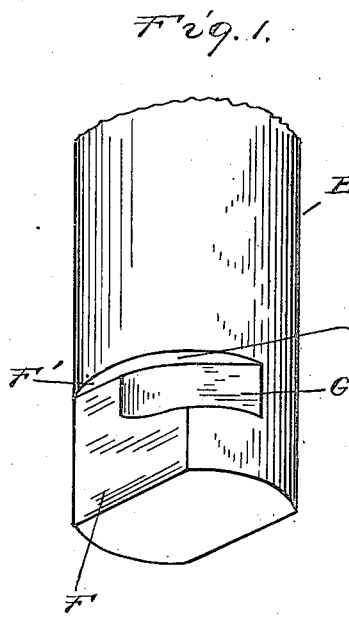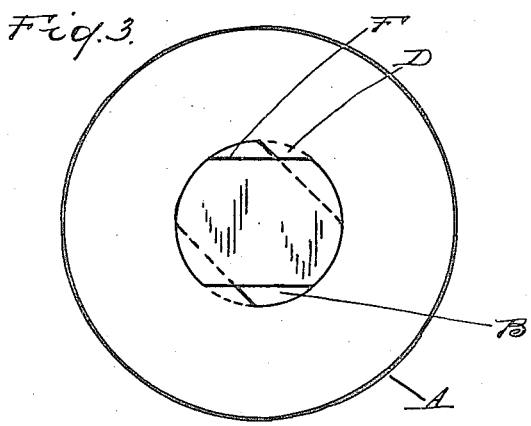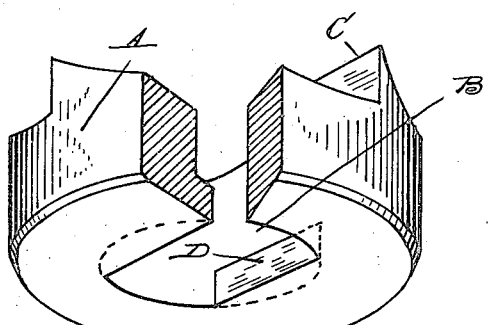

JOHN HUGO SMITH, OF DETROIT, MICHIGAN, ASSIGNOR TO THE ECLIPSE INTERCHANGEABLE COUNTERBORE COMPANY, OF DETROIT, MICHIGAN, A CORPORATION OF MICHIGAN.

COUNTERBORING TOOL.

1,424,743.  Specification of Letters Patent.  Patented Aug. 1, 1922.

Application filed March 19, 1920. Serial No. 367,138.

*To all whom it may concern:*

Be it known that I, JOHN HUGO SMITH, a citizen of the United States of America, residing at Detroit, in the county of Wayne and State of Michigan, have invented certain new and useful Improvements in Counterboring Tools, of which the following is a specification, reference being had therein to the accompanying drawings.

This invention relates to counterboring tools, and it is the object of the invention to provide a quick detachable engagement between a counterboring tool and a holder therefor.

More specifically, it is the object of the invention to provide a quick detachable driving interlock between the counterboring tool and its holder that will not give rise to any excessive stresses in the cutting member, such as might result in breakage thereof, and which will not constitute any limitation to the machining of the tool to form the cutting teeth thereof.

A preferred embodiment of the invention is hereinafter fully described and illustrated in the accompanying drawings, wherein;—

Figure 1 is a perspective view of a tool holding shank, machined in accordance with the described invention for engagement with a counterboring tool;

Figure 2 is a perspective view of the counterboring tool which is adapted for engagement with the shank shown in Figure 1;

Figure 3 is an end view of said shank;

Figure 4 is an axial sectional view, showing the tool in engagement with its holder.

In these views the reference character A designates a counterboring tool having the central socket B, and provided upon its under face with the cutting member C. Flush with the top plate of the cutter A the same is integrally formed within the socket B with a pair of opposed segmental ribs D, the opposed faces of said ribs being plane and parallel, and the corners of the ribs being square, as is best shown in Figure 4. The cutter A is adapted to be mounted upon a rotative holder E having the form of a cylindrical shank of a diameter to engage snugly in the socket B. To permit said shank to pass the ribs D in entering said socket, the lower extremity of the shank is planed away at opposite sides thereof, as indicated at F, the thickness of material intervening between the faces F being substantially equal to the distance between the ribs D. The planed faces F are terminated by shoulders F' perpendicular to said faces, and adjacent to said shoulders the shank is circumferentially notched, each notch cutting portions both of the planed face F and of the adjoining cylindrical face of the shank. The shoulders forming said notches are square, one of said shoulders being a continuation of the shoulder F'.

When the tool A has been slipped upon the shank E until the ribs D of said tool encounter the shoulder F', said tool is then given a slight turn in a direction opposed to that in which it is to be driven and the ribs D are thereby respectively engaged in the notches G. This engagement serves both to establish a driving connection from the shank to the tool and also to prevent shifting of the tool axially of the shank in either direction. To permit removal of the tool from the shank it is necessary only to first rotate the former relative to the latter slightly in the direction of drive, so as to shift the ribs D out of the notches G and register said ribs with the planed faces F of the shank E. The bottom portion of the groove G remote from the intersected planed face F is planed as indicated at G' and the driving torque acts entirely between the planed faces G' and the opposing planed faces of the ribs D. Thus, there can arise no axially acting component of the driving stress that might tend to result in breakage of the tool A. Such stresses as arise from axial feeding of the tool are transmitted from the square shoulders of the notches G to the ribs G' and the relative proportioning of the parts is such that in case such stresses become excessive the material of the shank E intervening between the end thereof and the notch G will shear off before such stresses are powerful enough to produce breakage of the tool.

In forming the described tool a bore is first produced centrally therein substantially equal in diameter to the distance between the ribs D. The bore B is then produced by counterboring, the counterbore terminating at a proper distance from the planed end face of the tool to form the ribs D. The formation of said ribs is then completed by a broaching operation which produces the opposed planed surfaces of the ribs and reduces the diameter of the walls intervening between said ribs to the diameter of the bore B.

While the invention is disclosed as applied to an inverted counterboring tool, it is to be understood that it is equally applicable to a counterboring tool of the non-inverted type as well as to other tools of various sorts.

What I claim as my invention is:

1. The combination with a holder member, of a tool member detachably mounted upon said holder member and adapted to be driven thereby, one of said members being formed with a socket and the other having a shank for engagement with said socket, the socket forming member having a pair of opposed ribs within its socket and said shank having oppositely arranged plane surfaces to pass between said ribs and being formed with oppositely arranged driving faces extending in rear of its plane faces, the latter being of greater depth than the depth of said ribs and said driving faces being of substantially the same depth as said ribs leaving notched portions engageable through a slight relative rotation of the holder member and tool member after the initial insertion of the shank in the socket.

2. The combination with a holder member, of a tool member detachably mounted upon said holder member and adapted to be driven thereby, one of said members being formed with a socket and the other having a shank for engagement with said socket, the socket forming member having a pair of opposed ribs within its socket and said shank having oppositely arranged plane surfaces to pass between said ribs and being formed with oppositely arranged driving faces extending in rear of its plane faces, the latter being of greater depth than the depth of said ribs and said driving faces being of substantially the same depth as said ribs leaving notched portions engageable through a slight relative rotation of the holder member and tool member after the initial insertion of the shank in the socket whereby the notched portions are brought beneath the opposed ribs and the driving surfaces have a relatively wide driving engagement with the opposed ribs.

In testimony whereof I affix my signature.

JOHN HUGO SMITH.